United States Patent
Bernardi et al.

(10) Patent No.: US 7,291,934 B2
(45) Date of Patent: Nov. 6, 2007

(54) MACHINE WITH AN ELECTRICAL SYSTEM

(75) Inventors: John Jay Bernardi, Chillicothe, IL (US); Timothy Allen Goldammer, Dunlap, IL (US); Brian Todd Morrical, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 93 days.

(21) Appl. No.: 11/213,866

(22) Filed: Aug. 30, 2005

(65) Prior Publication Data

US 2007/0210582 A1    Sep. 13, 2007

(51) Int. Cl.
*B60K 11/00*     (2006.01)

(52) U.S. Cl. .................. 290/40 A; 290/34; 123/41.01; 318/432; 180/65.1

(58) Field of Classification Search .................. 290/34, 290/40 A, 40 C; 123/41.01; 318/432, 434; 180/65.1
See application file for complete search history.

(56) References Cited

U.S. PATENT DOCUMENTS

| | | |
|---|---|---|
| 1,356,065 A | 10/1920 | Heinze |
| 1,412,250 A | 4/1922 | McGrew et al. |
| 1,774,634 A | 9/1930 | Coates |
| 2,113,884 A | 4/1938 | Gillett |
| 2,150,150 A | 3/1939 | Burrows et al. |
| 2,193,317 A | 3/1940 | Flogaus et al. |
| 2,300,631 A | 11/1942 | Ormsby |
| 2,356,066 A | 10/1944 | Heinze |
| 2,384,470 A | 9/1945 | Keese et al. |
| 2,798,166 A | 7/1957 | Karen |
| 2,900,547 A | 8/1959 | Engel |
| 2,901,048 A | 8/1959 | Krunkowski |
| 2,947,395 A | 8/1960 | Ullery |
| 3,093,348 A | 6/1963 | Schelp |
| 3,158,993 A | 12/1964 | Hodgson |
| 3,158,994 A | 12/1964 | Hodgson |
| 3,172,253 A | 3/1965 | Schelp et al. |
| 3,239,148 A | 3/1966 | Etnyre |
| 3,241,628 A | 3/1966 | Thomas |
| 3,246,465 A | 4/1966 | Bookout et al. |
| 3,357,191 A | 12/1967 | Berner |
| 3,452,731 A | 7/1969 | Becker |
| 3,596,647 A | 8/1971 | Heisler |
| 3,713,294 A | 1/1973 | Balje et al. |
| 3,834,161 A | 9/1974 | Quigley |
| 3,872,675 A | 3/1975 | Amiot |

(Continued)

FOREIGN PATENT DOCUMENTS

| | | |
|---|---|---|
| WO | WO 03/064202 A1 | 8/2003 |
| WO | WO 2004/025098 A1 | 3/2004 |

*Primary Examiner*—Nicholas Ponomarenko
(74) *Attorney, Agent, or Firm*—Finnegan, Henderson, Farabow, Garrett & Dunner

(57) ABSTRACT

A machine includes an electrical power source, which may include a mechanical power source and an electric generator drivingly connected to the mechanical power source. The machine may also include one or more power loads connected to the electric generator. Additionally, the machine may include power-supply controls, which may be configured to execute a control method. The control method may include receiving inputs relating to conditions of operation of the machine. Additionally, the control method may include controlling the speed at which the mechanical power source drives the electric generator, and the power consumption of one or more of the power loads connected to the electric generator, interdependently.

12 Claims, 3 Drawing Sheets

U.S. PATENT DOCUMENTS

| | | |
|---|---|---|
| 3,874,619 A | 4/1975 | Collins et al. |
| 3,928,971 A | 12/1975 | Spath |
| 3,934,531 A | 1/1976 | Allen |
| 3,960,121 A | 6/1976 | Backus |
| 3,973,470 A | 8/1976 | Fremlin et al. |
| 3,976,265 A | 8/1976 | Doolittle |
| 4,074,145 A | 2/1978 | Laffoon et al. |
| 4,113,041 A | 9/1978 | Birkeholm |
| 4,176,651 A | 12/1979 | Backus |
| 4,194,360 A | 3/1980 | Stieger |
| 4,312,310 A | 1/1982 | Chivilo et al. |
| 4,448,157 A | 5/1984 | Eckstein et al. |
| 4,489,242 A | 12/1984 | Worst |
| 4,566,699 A | 1/1986 | Cucuzza et al. |
| 4,611,466 A | 9/1986 | Keedy |
| 4,762,170 A | 8/1988 | Nijjar et al. |
| 4,845,944 A | 7/1989 | Rodgers |
| 5,000,998 A | 3/1991 | Bending |
| 5,031,477 A | 7/1991 | Rayner |
| 5,033,010 A | 7/1991 | Lawrence et al. |
| 5,045,027 A | 9/1991 | Larsen |
| 5,075,881 A | 12/1991 | Blomberg |
| 5,086,625 A | 2/1992 | Momose |
| 5,129,328 A | 7/1992 | Donnelly |
| 5,224,337 A | 7/1993 | Morishita |
| 5,283,471 A | 2/1994 | Raad |
| 5,333,678 A | 8/1994 | Mellum |
| 5,343,778 A | 9/1994 | Romero et al. |
| 5,408,821 A | 4/1995 | Romero et al. |
| 5,469,820 A | 11/1995 | Data et al. |
| 5,495,907 A | 3/1996 | Data |
| 5,497,615 A | 3/1996 | Noe et al. |
| 5,555,722 A | 9/1996 | Mehr-Ayin et al. |
| 5,558,588 A | 9/1996 | Schmidt |
| 5,558,589 A | 9/1996 | Schmidt |
| 5,606,946 A | 3/1997 | Data et al. |
| 5,617,732 A | 4/1997 | Albader |
| 5,619,956 A | 4/1997 | Koziara et al. |
| 5,715,124 A | 2/1998 | Votava et al. |
| 5,785,137 A | 7/1998 | Reuyl |
| 5,809,779 A | 9/1998 | Bruso |
| 5,813,630 A | 9/1998 | Williams |
| 5,842,534 A | 12/1998 | Frank |
| 5,898,282 A | 4/1999 | Drozdr et al. |
| 5,899,411 A | 5/1999 | Latos et al. |
| 5,931,757 A | 8/1999 | Schmidt et al. |
| 5,932,940 A | 8/1999 | Epstein et al. |
| 5,986,462 A | 11/1999 | Thomas et al. |
| 5,994,804 A | 11/1999 | Greenan et al. |
| 6,018,233 A | 1/2000 | Glennon et al. |
| 6,021,369 A | 2/2000 | Kamihira |
| 6,032,139 A | 2/2000 | Yamaguchi et al. |
| 6,048,288 A * | 4/2000 | Tsujii et al. ............... 477/5 |
| 6,064,996 A | 5/2000 | Yamaguchi et al. |
| 6,105,697 A | 8/2000 | Weaver |
| 6,116,363 A | 9/2000 | Frank et al. |
| 6,119,985 A | 9/2000 | Clapp et al. |
| 6,128,909 A | 10/2000 | Jonqueres |
| 6,151,548 A | 11/2000 | Kamihira et al. |
| 6,184,661 B1 | 2/2001 | Becker et al. |
| 6,209,495 B1 | 4/2001 | Warren |
| 6,224,321 B1 | 5/2001 | Ebden |
| 6,242,873 B1 | 6/2001 | Drozdz et al. |
| 6,244,034 B1 | 6/2001 | Taylor et al. |
| 6,252,331 B1 | 6/2001 | Mildice et al. |
| 6,278,262 B1 | 8/2001 | Ullyott |
| 6,278,986 B1 | 8/2001 | Kamihira et al. |
| 6,304,862 B1 | 10/2001 | Yamaguchi et al. |
| 6,314,412 B1 | 11/2001 | Yamaguchi et al. |
| 6,324,529 B1 | 11/2001 | Kamihira et al. |
| 6,324,530 B1 | 11/2001 | Yamaguchi et al. |
| 6,324,994 B1 | 12/2001 | Glenn et al. |
| 6,362,580 B1 * | 3/2002 | Omata et al. ............... 318/139 |
| 6,364,772 B1 | 4/2002 | Sugden et al. |
| 6,373,206 B1 * | 4/2002 | Morimoto et al. .......... 318/139 |
| 6,392,313 B1 | 5/2002 | Epstein et al. |
| 6,417,577 B1 * | 7/2002 | Grewe et al. ............. 290/40 C |
| 6,438,962 B1 | 8/2002 | Blain et al. |
| 6,462,429 B1 | 10/2002 | Dhyanchand et al. |
| 6,470,985 B1 | 10/2002 | Inada et al. |
| 6,484,830 B1 | 11/2002 | Gruenwald et al. |
| 6,536,207 B1 | 3/2003 | Kamen et al. |
| 6,555,927 B1 * | 4/2003 | Suzuki et al. ............... 290/34 |
| 6,573,675 B2 * | 6/2003 | Schmitz et al. ............. 318/434 |
| 6,625,534 B2 * | 9/2003 | Suzuki et al. ............... 701/62 |
| 6,651,759 B1 | 11/2003 | Gruenwald et al. |
| 6,696,774 B1 | 2/2004 | Schneider et al. |
| 6,721,647 B1 | 4/2004 | Kita et al. |
| 6,763,298 B2 | 7/2004 | Boggs et al. |
| 6,777,822 B1 | 8/2004 | Suttie et al. |
| 6,832,148 B1 * | 12/2004 | Bennett et al. ............... 701/54 |
| 6,836,086 B1 | 12/2004 | Goldberg et al. |
| 6,865,901 B2 | 3/2005 | Horn et al. |
| 6,868,927 B2 | 3/2005 | Boll et al. |
| 6,962,545 B2 * | 11/2005 | Larkin ............... 475/5 |
| 7,005,819 B2 * | 2/2006 | Takai et al. ............... 318/432 |
| 7,071,642 B2 * | 7/2006 | Wilton et al. ............... 318/268 |
| 7,127,337 B2 * | 10/2006 | Bennett et al. ............... 701/22 |
| 2001/0024107 A1 | 9/2001 | Jabaji |
| 2002/0129696 A1 | 9/2002 | Chong et al. |
| 2002/0132696 A1 | 9/2002 | Pannell |
| 2002/0165660 A1 | 11/2002 | Boggs et al. |
| 2002/0165696 A1 | 11/2002 | Bond et al. |
| 2002/0188397 A1 | 12/2002 | Biess et al. |
| 2003/0033992 A1 | 2/2003 | Ohnemus |
| 2003/0050745 A1 | 3/2003 | Orton |
| 2003/0070849 A1 | 4/2003 | Clark |
| 2003/0098188 A1 | 5/2003 | Gu et al. |
| 2003/0104899 A1 | 6/2003 | Keller |
| 2003/0105567 A1 | 6/2003 | Koenig et al. |
| 2003/0145603 A1 | 8/2003 | Reed et al. |
| 2003/0201097 A1 | 10/2003 | Zeigler et al. |
| 2003/0230440 A1 | 12/2003 | Kamen et al. |
| 2003/0232231 A1 | 12/2003 | Stute et al. |
| 2004/0006994 A1 | 1/2004 | Walsh et al. |
| 2004/0035112 A1 | 2/2004 | Bhabra |
| 2004/0060751 A1 | 4/2004 | Frank |
| 2004/0078095 A1 | 4/2004 | Mizutani |
| 2004/0148087 A1 | 7/2004 | Lange |
| 2004/0150232 A1 | 8/2004 | Xu et al. |
| 2004/0189091 A1 | 9/2004 | Algrain et al. |
| 2004/0189098 A1 | 9/2004 | Algrain et al. |
| 2004/0211605 A1 | 10/2004 | Botti |
| 2004/0238245 A1 | 12/2004 | Gu et al. |
| 2005/0000161 A1 | 1/2005 | Petersson et al. |
| 2005/0035657 A1 | 2/2005 | Brummett et al. |

* cited by examiner

MACHINE WITH AN ELECTRICAL SYSTEM

TECHNICAL FIELD

The present disclosure relates to machines with electrical systems and, more particularly, to methods for operating machine electrical systems.

BACKGROUND

Machines often include an electrical system for facilitating operation of the machine and/or increasing the comfort and satisfaction of an operator of the machine. Such electrical systems may include one or more power sources that produce electrical power, one or more power-consuming devices, and power-transmission systems for distributing power from the power sources to the power-consuming devices. The power sources of such electrical systems may include an electric generator drivingly connected to a mechanical power source, such as an engine. The power capacity of such an electric power source may depend upon the speed at which the mechanical power source drives the electric generator. Often, the mechanical power source of the power unit is operated at a substantially constant speed and drives the electric generator at a substantially constant speed, while an operator is allowed full control over the operating state of the power loads. Unfortunately, this approach may result in power deficits if the operator controls the power loads in such a manner that their aggregate power need exceed the power capacity of the power source with the mechanical power source driving the electric generator at that particular speed.

U.S. Pat. No. 6,777,822 ("the '822 patent") discloses a method of operating an electrical system, including adjusting the speed at which an engine of an APU (auxiliary power unit) drives an electric generator of the APU dependant upon the power needs of the power loads of the electrical system. The '822 patent discloses an electrical system with a APU including a gas turbine engine that drives a permanent magnet generator to produce electricity. For a given operating speed of the gas turbine engine, the output voltage of the permanent magnet generator depends on the current draw of the power loads connected to the permanent magnet generator. As the current draw of the power loads increases, the output voltage of the permanent magnet generator decreases and vice versa.

The method disclosed by the '822 patent includes controlling the operating speed of the gas turbine engine to maintain the output voltage of the permanent magnet generator at a target level. If the current draw of the power loads increases and causes the output voltage of the permanent magnet generator to fall, the operating speed of the gas turbine engine is increased to increase the power output of the permanent magnet generator and bring the output voltage of the permanent magnet generator back toward the target level. Similarly, the operating speed of the gas turbine engine is decreased if the output voltage of the permanent magnet generator rises above the target level.

Although the control method of the '822 application adjusts the speed at which the gas turbine engine drives the permanent magnet generator dependant upon the power needs of the power loads, certain disadvantages persist. Adjusting the speed at which the gas turbine engine drives the permanent magnet generator, by itself, may provide a limited ability to effectively respond to changing conditions in which the electrical system operates. For example, in some circumstances, the power needs of the power loads may rise quickly enough to overwhelm the APU and prevent the gas turbine engine from achieving a speed increase to accommodate the increased power needs.

The control methods of the present disclosure solve one or more of the problems set forth above.

SUMMARY OF THE INVENTION

One disclosed embodiment relates to a machine. The machine may include an electrical power source, which may include a mechanical power source and an electric generator drivingly connected to the mechanical power source. The machine may also include one or more power loads connected to the electric generator. Additionally, the machine may include power-supply controls, which may be configured to execute a control method. The control method may include receiving inputs relating to conditions of operation of the machine. Additionally, the control method may include controlling the speed at which the mechanical power source drives the electric generator, and the power consumption of one or more of the power loads connected to the electric generator, interdependently.

Another embodiment relates to a machine. The machine may include an electrical power source, which may include a mechanical power source and an electric generator drivingly connected to the mechanical power source. The machine may also include one or more power loads connected to the electric generator. Additionally, the machine may include power-supply controls configured to execute a control method. The control method may include receiving inputs relating to conditions of operation of the machine. The control method also include adjusting controls of the mechanical power source to increase the operating speed of the mechanical power source from a first speed. According to the method, during a transition period following adjustment of the controls of the mechanical power source to increase its operating speed, the power-supply controls may control the amount of power consumed by one or more of the power loads to avoid overwhelming the electrical power source.

A further embodiment relates to a machine. The machine may include a mechanical power source and an AC electric generator drivingly connected to the mechanical power source. The machine may also include a power converter configured to convert alternating current produced by the AC electric generator into direct current. Additionally, the machine may include one or more power loads connected to the power converter. Furthermore, the machine may include power-supply controls configured to execute a control method. The control method may include receiving inputs relating to conditions of operation of the machine. The control method may further include controlling a speed at which the mechanical power source drives the AC electric generator as a function of an estimated power need of one or more of the power loads.

DETAILED DESCRIPTION

Figure 1:
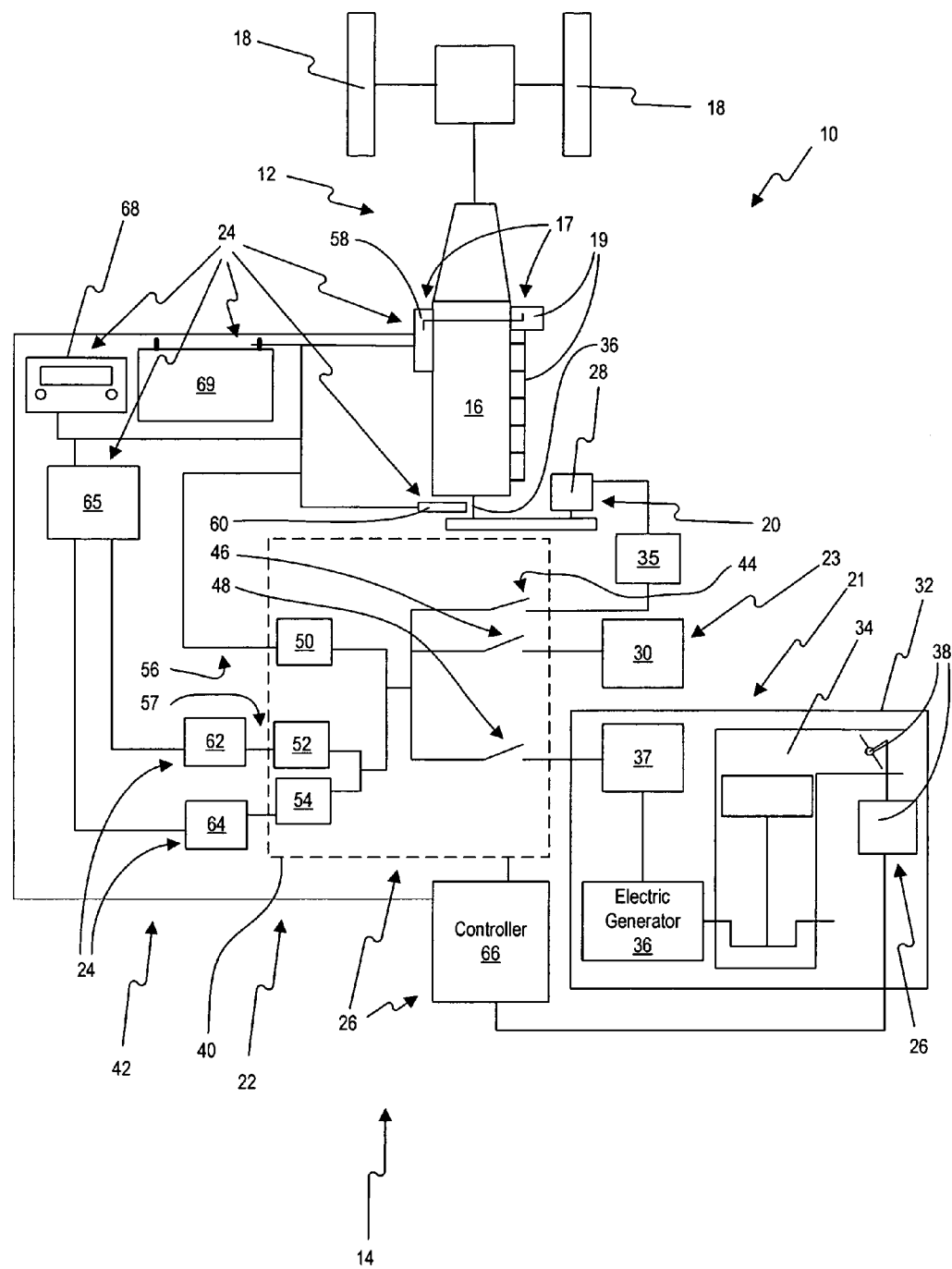
FIG. 1 is a schematic illustration of a machine according to one disclosed embodiment.

FIG. 1 provides a schematic view of a machine 10. Machine 10 may include a propulsion system 12 and an electrical system 14. While FIG. 1 shows machine 10 as land-based, machine 10 may be a water vessel or an aircraft.

Propulsion system 12 may include a prime mover 16 and one or more propulsion devices 18. Prime mover 16 may be any type of device configured to produce power for propelling machine 10, including, but not limited to, a diesel engine, a gasoline engine, a gaseous fuel driven engine, and a turbine. Prime mover 16 may include controls 17, such as, for example, a prime-mover controller 58 and a fuel-injection system 19, for controlling the operating speed and/or power output of prime mover 16. Propulsion devices 18 may be any type of component configured to receive power produced by prime mover 16 and utilize that power to propel machine 10. For example, propulsion devices 18 may be wheels, track units, or propellers.

Electrical system 14 may be configured to utilize electricity to perform various functions to facilitate operation of machine 10 and/or increase the comfort and satisfaction of an operator. Electrical system 14 may include one or more electrical power sources 20, 21, 23, a power-transmission system 22, one or more power loads 24, and power-supply controls 26.

Electrical power sources 20 and 21 may include an electric generator drivingly connected to a mechanical power source. For example, electrical power source 20 may include a prime-mover-driven electric generator 28 drivingly connected to prime mover 16. In some embodiments prime-mover-driven electric generator 16 may be an AC generator configured to generate alternating current. In some embodiments, a power converter 35 connected to prime-mover-driven electric generator 28 may be configured to convert alternating current produced by prime-mover-driven electric generator 28 into direct current. As is shown in FIG. 1, power converter 35 may be mounted at a physical distance from prime-mover-driven electric generator 28, alternatively, power converter 35 may be disposed within prime-mover-driven electric generator 28.

Additionally, electrical power source 21 may be an APU (auxiliary power unit) 32, which may include another electric generator 36 drivingly connected to a mechanical power source 34. Mechanical power source 34 may be any type of device configured to drive electric generator 36, such as, for example, a diesel engine, a gasoline engine, a gaseous fuel driven engine, or a turbine engine. Mechanical power source 34 may include controls 38 for controlling its operating speed and/or power output.

Electric generator 36 may be any type of device configured to receive power from mechanical power source 34 and produce electric current. In some embodiments, electric generator 36 may be an AC generator configured to produce alternating current. In some embodiments, APU 32 may include a power converter 37 for converting alternating current produced by electric generator 36 into direct current. As is shown in FIG. 1, power converter 37 may be mounted at a physical distance from electric generator 36, alternatively, power converter 37 may be disposed within electric generator 37.

APU 32 is not limited to the embodiment illustrated in FIG. 1. For example, APU 32 may omit power converter 37, regardless of whether electric generator 36 is an AC generator. In some embodiments, electric generator 36 may be an AC generator, and power-transmission system 22, rather than APU 32, may include a power converter for converting alternating current produced by electric generator 36 into direct current.

Power-transmission system 22 may include a power electronics module 40 and a distribution network 42. Power electronics module 40 may include switching devices 44, 46, and 48 for selectively connecting power-transmission system 22 to prime-mover-driven electric generator 28, shore power interface 30, and APU 32, respectively. Additionally, power electronics module 40 may include one or more power adjusters 50, 52, 54 for adjusting the amount of power supplied to different portions of distribution network 42. Distribution network 42 may include various electrical conductors, such as wires and switches, connecting power adjusters 50, 52, 54 to power loads 24. A first portion 56 of distribution network 42 may extend from power adjuster 50, and a second portion 57 of distribution network 42 may extend from power adjusters 52 and 54.

Power-transmission system 22 is not limited to the configuration shown in FIG. 1. For example, power-transmission system 22 may omit one or more of switching devices 44, 46, 48 and/or one or more of power adjusters 50, 52, 54. Additionally, rather than being located together in power electronics module 42, switching devices 44, 46, 48 and power adjusters 50, 52, 54 may be physically dispersed.

Power loads 24 may be connected to distribution network 42 so as to receive power therefrom and utilize that power to perform various tasks. Power loads 24 connected to first portion 56 of distribution network 42 may include prime-mover controller 58, a sensor 60, an HVAC controller 65, a radio 68, and a battery 69. Power loads 24 connected to second portion 57 of distribution network 42 may include an air conditioner compressor 62 and an electric heating element 64. HVAC controller 65 may be operatively connected to and configured to control the operating states of air conditioner compressor 62 and electric heating element 64.

Power-supply controls 26 may include power electronics module 40, a power-supply controller 66, and controls 38 of mechanical power source 34. Power-supply controller 66 may include one or more processors (not shown) and one or more memory devices (not shown). Power-supply controller 66 may be communicatively linked to various controllers, such as prime-mover controller 58, HVAC controller 65, and/or various other controllers of machine 10. Additionally, power-supply controller 66 may be communicatively linked to sensor 60 and various other sensors of machine 10. Power-supply controller 66 may receive inputs relating to operating conditions of machine 10, including inputs relating to operating conditions of electrical system 14, from the various controllers and sensors it is communicatively linked to.

Additionally, power-supply controller 66 may be operatively connected to various components of machine 10 in such a manner to control one or more aspects of operation of those components. For example, power-supply controller 66 may be operatively connected to power electronics module 40 so as to control one or more aspects of its operation. Furthermore, power-supply controller 66 may be operatively connected to controls 38 of mechanical power source 34, such that power-supply controller 66 may be capable of adjusting controls 38 to change the operating speed of mechanical power source 34. Moreover, power-supply controller 66 may be operatively connected to controls 17 of prime mover 16, such that power-supply controller 66 may adjust controls 17 of prime mover 16 to change the operating speed of prime mover 16. Additionally, power-supply controller 66 may be operatively connected to and configured to control the operating state of one or more power loads 24.

Machine 10 is not limited to the embodiment illustrated in FIG. 1. For example, machine 10 may omit one or more of electrical power sources 20, 21, 23. Additionally, machine 10 may include one or more electrical power sources not shown in FIG. 1, such as one or more electric generators drivingly connected to a mechanical power source, other than those shown in FIG. 1. Furthermore, machine 10 may omit propulsion system 12. Moreover, machine 10 may omit one or more of the power loads 24 shown in FIG. 1 and/or include other power loads not shown in FIG. 1.

INDUSTRIAL APPLICABILITY

The disclosed embodiments have application in any machine 10 having electrical power loads 24. The operation of an electrical system 14 of a machine 10 according to the disclosed embodiments is described below.

One or more of electrical power sources 20, 21, 23 may provide power to switching devices 44, 46, and/or 48. When prime mover 16 is operating, it may drive prime-mover-driven electric generator 28, and prime-mover-driven electric generator 28 may generate electricity and transmit that electricity to switching device 44. Shore power interface 30 may receive power from an external source of power and transmit that power to switching device 46. When mechanical power source 34 is operating, it may drive electric generator 36, and electric generator 36 may provide power to switching device 48. The power capacity of APU 32 at any given time may depend upon the operating speed of mechanical power source 34 and the speed at which mechanical power source 34 drives electric generator 36. The power capacity of APU 32 may increase as the speed at which electric generator 36 is driven is increased and also as the operating speed of mechanical power source 34 is increased. In some embodiments, such as the one shown in FIG. 1, the electric generator 36 may be driven at a speed proportional to the operating speed of the mechanical power source 34.

Under the control of power-supply controller 66, power electronics module 40 may transmit power from one or more of switching devices 44, 46, and 48 to distribution network 42. Power-supply controller 66 may cause one or more switching devices 44, 46, and/or 48 that are receiving power from an electrical power source 20, 21, 23 to be closed and transmit power to power adjusters 50, 52, and 54. Power-supply controller 66 may also control the amount of power that each power adjuster 50, 52, 54 supplies to distribution network 42 and, thus, the aggregate amount of power supplied to distribution network 42. Distribution network 42 may transmit power received from power adjusters 50, 52, and 54 to power loads 24.

Power-supply controls 26 may exercise individualized, automatic control over the amount of power consumed by some or all of power loads 24. For example, in the embodiment illustrated in FIG. 1, because air conditioner compressor 62 is the only power load connected to power adjuster 52, power-supply controller 66 may control the amount of power consumed by air conditioner compressor 62 by controlling the power output of power adjuster 52. Additionally, power-supply controller 66 may execute individualized control over the amount of power consumed by a particular power load 24 by directly or indirectly controlling the operating state of the power load 24. Power-supply controller 66 may indirectly control the operating state of one or more power loads 24, such as air conditioner compressor 62, through interaction with other controllers, such as HVAC controller 65, that directly control the operating state of those power loads 24.

In some embodiments, however, power-supply controls 26 may be incapable of individualized, automatic control of the amount of power consumed by some power loads 24. This may be so in embodiments where multiple power loads are connected to a single power adjuster 50, 52, 54 and power-supply controller 66 is incapable of directly or indirectly controlling the operating state of one or more of those power loads 24. Nonetheless, power-supply controls 26 may control the aggregate power consumption of a group of power loads 24 by controlling the power supplied by a power adjuster 50, 52, 54. For example, power-supply controls 26 may control the aggregate power consumption of prime-mover controller 58, sensor 60, HVAC controller 65, radio 68, and battery 69 by controlling the amount of power that power adjuster 50 supplies to first portion 56 of distribution network 42.

Figure 2A:
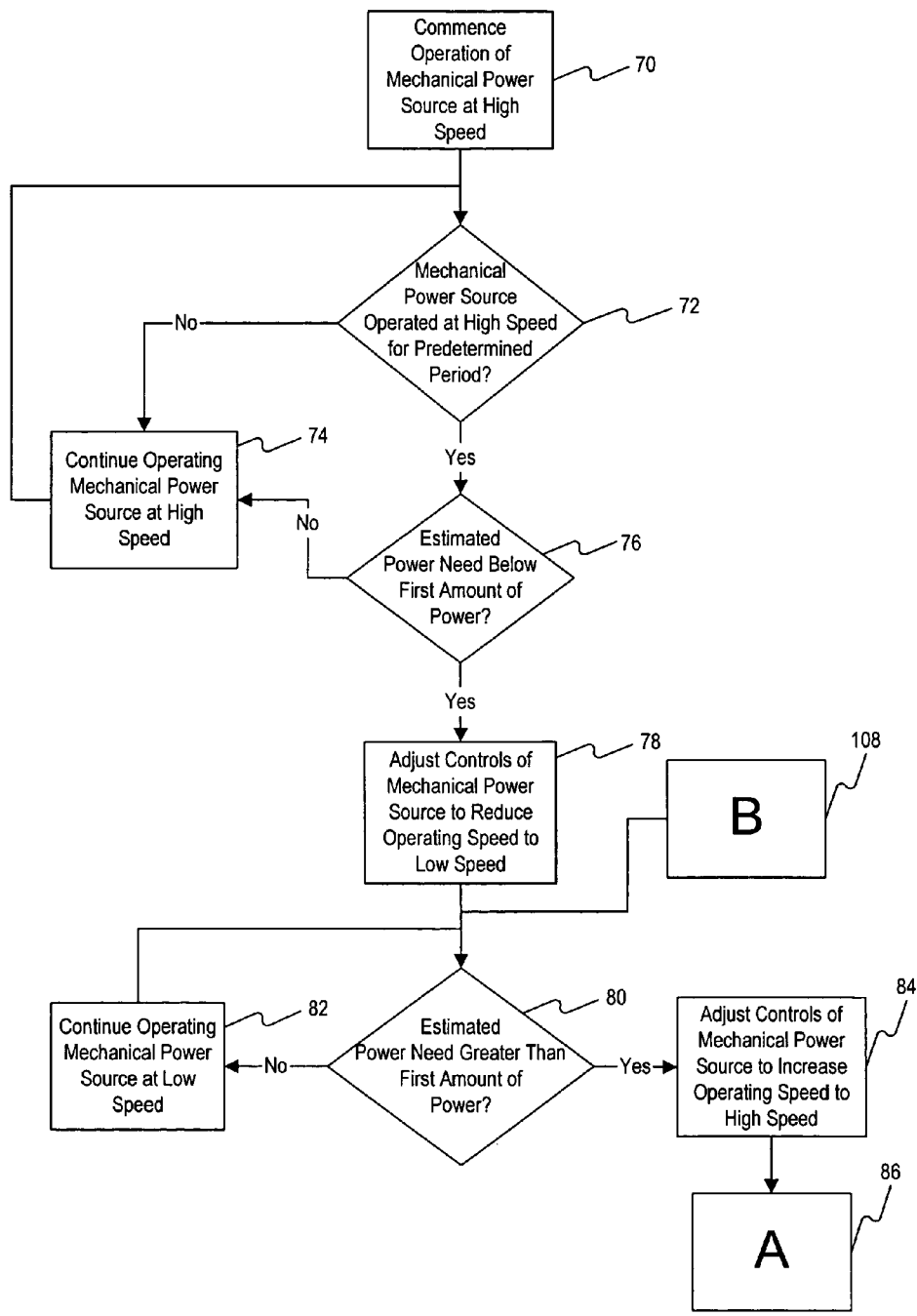
FIG. 2A is a first portion of a flow chart illustrating one method of operating an electrical system.
Figure 2B:
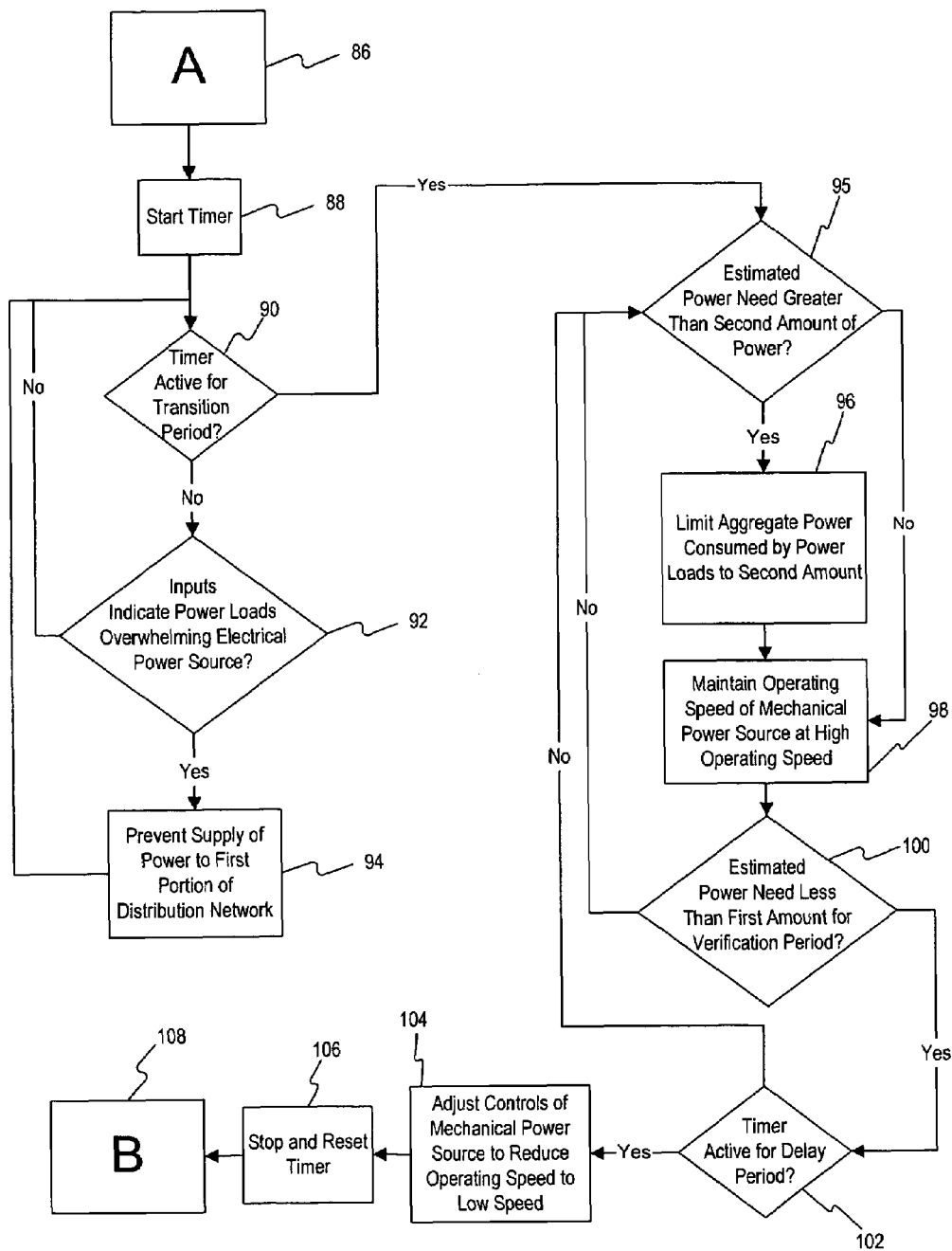
FIG. 2B is a second portion of the flow chart of FIG. 2A.

Power-supply controls 26 may control the operation of one or more of electrical power sources 20, 21, 23 and the amount of power consumed by one or more power loads 24 interdependently. For example, power-supply controls 26 may coordinate control of the speed at which prime-mover-driven electric generator 28 or electric generator 36 is driven and the power consumption of one or more of power loads 24. FIGS. 2A and 2B include a flow chart that illustrates one embodiment of a method according to which power-supply controls 26 may do so. Some or all of the control logic embodied in the flow chart of FIGS. 2A and 2B may be utilized in controlling the speed at which mechanical power source 34 drives electric generator 36, the speed at which prime mover 16 drives prime-mover-driven electric generator 28, or the speed at which any other mechanical power source drives any other electric generator connected to power-transmission system 22. By way of example, a description of execution of the method of FIGS. 2A and 2B to control the speed at which mechanical power source 34 drives electric generator 36 follows.

When operation of APU 32 is commenced, power-supply controller 66 may cause controls 38 of mechanical power source 34 to be adjusted to cause mechanical power source 34 to operate at a predetermined, high operating speed (step 70). Power-supply controller 66 may cause mechanical power source 34 to operate at this high operating speed for a predetermined period (steps 72 and 74), such as 5 minutes. This may expedite warm-up of mechanical power source 34 and ensure sufficient power capacity to meet initial power needs of power loads 24.

After this initial operating period, power-supply controls 26 may adjust the operating speed of mechanical power source 34 dependent upon an estimate of the aggregate power need of power loads 24. In order to estimate the aggregate power need of power loads 24, power-supply controller 66 may receive inputs indicating the amount of power that power loads 24 are currently consuming. Power-supply controller 66 may receive such inputs from power electronics module 40, from one or more power loads 24, from sensors, and/or from other controllers. Power-supply controller 66 may use such inputs to determine the aggregate amount of power that power loads 24 are currently consuming.

The current, aggregate power consumption of power loads 24 may serve as a baseline estimate of the aggregate power need of power loads 24. In some embodiments, power-supply controller 66 may adjust this baseline estimate of the aggregate power need up or down to account for desired and/or impending changes in the operating state of one or more power loads 24. For example, in response to inputs from HVAC controller 65 indicating impending changes in the activity level of air conditioner compressor 62 or electric heating element 64, power-supply controller 66 may adjust the aggregate power need estimate to account for the corresponding, impending changes in power consumption.

After estimating the aggregate power need of power loads 24, power-supply controller 66 may determine whether the estimated, aggregate power need is less than a first amount of power (step 76), which may be a predetermined value, such as 2 kilowatts. If so, power-supply controller 66 may cause controls 38 of mechanical power source 34 to be adjusted to reduce the operating speed of mechanical power source 34 to a low operating speed (step 78). When the mechanical power source 34 is operating at the low operating speed, the power capacity of APU 32 may be approximately equal to the first amount of power referenced at step 76. As long as the estimated, aggregate power need of power loads 24 does not rise above the first amount of power (step 80), power-supply controller 66 may continue to utilize controls 38 of mechanical power source 34 to maintain its operating speed at the low speed (step 82).

If the estimated, aggregate power need of power loads 24 rises above the first amount of power (step 80), power-supply controller 66 may cause controls 38 of mechanical power source 34 to be adjusted to increase the operating speed of mechanical power source 34 back to the high speed (step 84). During a subsequent transition period, such as 5 seconds, power-supply controller 66 may take actions to ensure that power loads 24 don't overwhelm APU 32 and prevent mechanical power source 34 from actually reaching the high speed. From step 84, power-supply controller 66 may proceed to block 86 and from there to step 88, shown on FIG. 2B. At step 88, power-supply controller 66 may start a timer to track the time since causing controls 38 to be adjusted to increase the operating speed of mechanical power source 34.

Until the timer has been active for the transition period (step 90), power-supply controller 66 may determine whether inputs indicate that the voltage in a portion of distribution network 42, such as second portion 57, is below a predetermined level (step 92), such as 325 volts. If so, power loads 24 may be consuming enough power to overwhelm APU 32 and prevent mechanical power source 34 from accelerating its operating speed to the high speed. In response, power-supply controller 66 may suppress the aggregate power consumption of power loads 24, such as by preventing power adjuster 52 from supplying power to first portion 56 of distribution network 42 (step 94), until the transition period has ended or the voltage in second portion 57 of distribution network 42 rises above the predetermined level referenced at step 92. Suppressing the amount of power consumed by power loads 24 to prevent overwhelming APU 32 during transition periods may enhance the ability to effectively respond to changing power needs of power loads 24.

After the transition period has expired, power-supply controller 66 may determine if the estimated aggregate power need of power loads 24 is above a second amount of power (step 95), such as 5 kilowatts, which may be approximately equal to the power capacity of APU 32 with mechanical power source 34 operating at the high speed. If so, power-supply controller 66 may limit the aggregate power consumption of power loads 24 to the second amount of power (step 96). Power-supply controller 66 may so limit the power consumption of power loads 24 by controlling the amount of power supplied to distribution network 42 by power adjusters 50, 52, and 54 and/or by controlling the operating state of various power loads 24. Limiting the power consumption of power loads 24 may prevent power deficits in circumstances where increasing the operating speed of mechanical power source 34 may be undesirable. Power-supply controller 66 may subsequently cause controls 38 of mechanical power source 34 to maintain its operating speed at the high speed (step 98).

While causing controls 38 of mechanical power source 34 to maintain its operating speed at the high speed, power-supply controller 66 may determine whether the estimated, aggregate power need of power loads 24 has fallen below the first amount of power for a verification period, such as 5 seconds (step 100). If so, power-supply controller 66 may determine whether the timer has been active for a delay period, such as 2 minutes (step 102). If the timer has been active for the delay period, power-supply controller 66 may cause controls 38 of mechanical power source 34 to be adjusted to reduce the operating speed of mechanical power source 34 back to the low speed (step 104), stop and reset the timer (step 106), and proceed to block 108 and, from there, back to step 80. If the timer has not been active for the delay period, power-supply controller 66 may maintain the operating speed of mechanical power source 34 at the high speed. This may avoid excessive cycling of the operating speed of mechanical power source 34.

Methods of controlling operation of a power source 20, 21, 23, and the power consumption of one or more of power loads 24 are not limited to the embodiments discussed above in connection with FIGS. 2A and 2B. For example, as mentioned above, power-supply controls 26 may control the operating speed of a generator other than electric generator 36, such as prime-mover-driven electric generator 28, according to some or all of the control logic embodied in FIGS. 2A and 2B. Additionally, power-supply controls 26 may omit one or more of the steps shown in FIGS. 2A and 2B and/or execute steps not shown in FIGS. 2A and 2B. Furthermore, power-supply controls 26 may cause an electric generator 28, 36 to be operated at more speeds than two. In some embodiments, power-supply controls 26 may adjust the speed at which an electric generator 28, 36 is driven through a continuous range of speeds, dependent upon the estimated, aggregate power needs of power loads 24. Furthermore, power-supply controls 26 may implement different methods of controlling the speed at which an electric generator 28, 36 is driven, such as adjusting a drive ratio between mechanical power source 34 and electric generator 36.

Additionally, power-supply controls 26 may implement different methods of controlling the power consumption of power loads 24 during the transition period to avoid overwhelming an electrical power source 20, 21. Power-supply controls 26 may limit the amount of power supplied to second portion 57 of distribution network 42 in addition to, or in place of, limiting the amount of power supplied to first portion 56 of distribution network 42. Furthermore, power-supply controls 26 may limit power consumption during the transition period by directly or indirectly controlling the operating state of one or more of power loads 24 in addition to, or in place of, limiting the power supplied. Moreover, power-supply controls 26 may actively control the power consumption of power loads 24 during the transition period without waiting to receive inputs indicating that power loads 24 may be overwhelming the APU 32. For example, power-supply controller 66 may monitor the speed at which an electric generator 28, 36 is driven, continuously estimate the actual power capacity of the electric generator 28, 36 during the transition period, and maintain the power consumption of power loads 24 at or below that estimated power capacity.

Furthermore, power-supply controls 26 may implement different conditions and/or parameters for adjusting the speed at which an electric generator 28, 36 is driven and/or limiting power consumption of power loads 24. In some embodiments, power-supply controls 26 may adjust the speed at which an electric generator 28, 36 is driven based on the estimated power needs of a subset of power loads 24 connected to power-transmission system 22, rather than the estimated, aggregate power needs of all power loads 24 connected to power-transmission system 22. Additionally, one or more of the various values referenced during the control method, such as the various amounts of power and periods, may be defined as a function of operating conditions of machine 10, rather than being defined as a predetermined, finite value.

Power-supply controls 26 may control the operating speed of all electric generators 28, 36 as a function of the power needs of power loads 24. Alternatively, power-supply controls 26 may control the operating speed of only some of the electric generators 28, 36 as a function of the power needs of power loads 24. For example, power-supply controls 26 may control the speed at which mechanical power source 34 drives electric generator 36 as a function of the power needs of power loads 24 and allow prime mover 16 to drive prime-mover-driven electric generator 28 independent of the power needs of power loads 24.

Power-supply controls 26 may selectively control the operating speed of a particular electric generator 28, 36 as a function of the power needs of power loads 24. For example, in some embodiments, power-supply controls 26 may control the speed at which prime mover 16 drives prime-mover-driven electric generator 28 as a function of the power needs of power loads 24 only when prime mover 16 is not supplying power to propulsion devices 18. When prime mover 16 is supplying power to propulsion devices 18, allowing prime mover 16 to drive prime-mover-driven electric generator 28 at a speed independent of the power needs of power loads 24 may be desirable so as to allow free adjustment of the operation of prime mover 16 to meet propulsion needs of machine 10.

Additionally, however, power-supply controls 26 may control the operating speed of a particular electric generator 28, 36 as a function of the power needs of power loads 24 whenever that electric generator 28, 36 is supplying power. For example, power-supply controls 26 may control the speed at which mechanical power source 34 drives electric generator 36 as a function of the power needs of power loads 24 whenever electric generator 36 is supplying power. In some embodiments, such as the one illustrated in FIG. 1, power-supply controls 26 may freely adjust the operating speed of mechanical power source 34 without adversely affecting propulsion of machine 10.

It will be apparent to those of ordinary skill in the art that various modifications and variations can be implemented with machine 10, electrical system 14, and the disclosed methods of operating them without departing from the scope of the disclosure. Other embodiments will be apparent to those skilled in the art from consideration of the specification and practice of machine 10, electrical system 14, and the disclosed methods of operating them. It is intended that the disclosure of these embodiments be considered as exemplary only, with a true scope of the invention being indicated by the following claims and their equivalents.

What is claimed is:

1. A machine, including:
    an electrical power source, including a mechanical power source and an electric generator drivingly connected to the mechanical power source;
    one or more power loads connected to the electric generator; and
    power-supply controls configured to execute a control method, including:
        receiving inputs relating to conditions of operation of the machine; and
        controlling the speed at which the mechanical power source drives the electric generator, and the power consumption of one or more of the power loads connected to the electric generator, interdependently.

2. The machine of claim 1, wherein the control method includes:
    causing the mechanical power source to drive the electric generator at a first speed under a first set of conditions, including an estimated power need of a set of one or more of the power loads connected to the electric generator being below a first amount of power; and
    causing the mechanical power source to drive the electric generator at a second speed, higher than the first speed, under a second set of conditions, including the estimated power need of the set of one or more of the power loads connected to the electric generator being above the first amount of power.

3. The machine of claim 2, wherein the control method further includes:
    while causing the mechanical power source to drive the electric generator at the second speed, if the estimated power need of the set of one or more of the power loads connected to the electric generator exceeds a second amount of power, higher than the first amount of power, limiting the amount of power consumed by the set of one or more of the power loads connected to the electric generator to the second amount of power.

4. The machine of claim 3, wherein the second amount of power is substantially equal to the power capacity of the electrical power source with the mechanical power source driving the electric generator at the second speed.

5. The machine of claim 2, wherein the control method includes:
    in response to the estimated power need of the set of one or more of the power loads connected to the electric generator increasing from below the first amount of power to above the first amount of power, increasing the speed at which the mechanical power source drives the electric generator from the first speed to the second speed; and
    subsequently, maintaining the speed at which the mechanical power source drives the electric generator at the second speed for at least a predetermined delay period.

6. The machine of claim 2, wherein the first set of conditions includes the mechanical power source having operated for at least a predetermined period.

7. The machine of claim 1, wherein the control method includes:
    in response to an increase in an estimated power need of one or more of the power loads connected to the electric generator:
        adjusting controls of the mechanical power source to increase its operating speed; and during a transition period following the adjustment of the controls of the mechanical power source to increase its operating speed, controlling the amount of power consumed by one or more of the power loads to avoid overwhelming the electrical power source.

8. The machine of claim 1, wherein:

the electric generator is an alternating current generator; and power produced by the electric generator is converted from alternating current to direct current before being delivered to the power loads connected to the electric generator.

9. The machine of claim 1, further including:
a propulsion system, including:
a prime mover; and
one or more propulsion devices drivingly connected to the prime mover.

10. The machine of claim 9, wherein the electrical power source is an auxiliary power unit.

11. The machine of claim 10, wherein the mechanical power source is a prime mover.

12. The machine of claim 1, wherein controlling the speed at which the mechanical power source drives the electric generator includes adjusting controls of the mechanical power source to control the speed at which the mechanical power source operates.

* * * * *